(12) United States Patent
Johansson et al.

(10) Patent No.: US 7,602,910 B2
(45) Date of Patent: Oct. 13, 2009

(54) PASSWORD PROTECTION

(75) Inventors: Jesper M Johansson, Woodinville, WA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 10/990,798

(22) Filed: Nov. 17, 2004

(65) Prior Publication Data

US 2006/0104441 A1    May 18, 2006

(51) Int. Cl.
*H04L 9/00*    (2006.01)
(52) U.S. Cl. .......................................... 380/44
(58) Field of Classification Search ............ 380/44; 713/175, 184
See application file for complete search history.

(56) References Cited

U.S. PATENT DOCUMENTS

2003/0149666 A1 * 8/2003 Davies ................. 705/50
2003/0154376 A1 * 8/2003 Hwangbo .............. 713/173
2004/0030901 A1   2/2004 Wheeler et al.
2005/0120205 A1 * 6/2005 Umezawa et al. ........ 713/156

FOREIGN PATENT DOCUMENTS

EP    0752636    1/1997

OTHER PUBLICATIONS

Bellovin et al., "Ecrypted Key Exchange: Password-Based Protocols Secure Against Dictionary Attacks", Proceedings of the Computer Society Symposium on Research in Security and Privacy. Oakland, May 4-6, 1992, Los Alamitos, IEEE Comp. Soc. Press, US, vol. Symp. 13, pp. 72-84.
Wu, T. "The SRP Authentication and Key Exchange System" Sep. 2000, pp. 1-8.

* cited by examiner

*Primary Examiner*—Matthew B Smithers
*Assistant Examiner*—Ali S Abyaneh
(74) *Attorney, Agent, or Firm*—Lee & Hayes, PLLC

(57) ABSTRACT

Systems and methods for password protection are described. In one aspect, an asymmetric key pair is deterministically formed by combining a password and other data. The public key of the asymmetric key pair is exported to an external device. The private key of the asymmetric key pair is used to effect subsequent authentications to the external device.

24 Claims, 4 Drawing Sheets

PASSWORD PROTECTION

TECHNICAL FIELD

This disclosure relates to password protection and authentication.

BACKGROUND

Security aware operating systems need the ability to authenticate users. User authentication can be done in several ways. In its simplest form, user authentication is based on some combination of a user authenticator and a user identity. The user authenticator is derived from something unique that the user knows such as a password. More recent, and sophisticated, multi-factor authentication mechanisms also rely on something the user has—usually a token represented by some form of hardware—something the user is—a biometric authenticator such as a fingerprint or a retinal pattern, or some combination of all three. However, even in such multi-factor authentication systems, passwords are used for particular operations and therefore need to be managed and stored. The storage of passwords, or some representation derived from passwords, is a difficult problem.

Various techniques have been used to store passwords, but all have certain flaws rendering them unsuitable as the attacks against stored passwords become more sophisticated and the computer hardware available to an attacker becomes faster. For instance, one of the simplest schemes for storing a password is to simply store the password itself. However, in such a scenario, an attacker that manages to obtain the list of passwords can immediately use all the passwords. To combat such unhindered access, systems attempted to obfuscate passwords with simple mathematical operations, such as those based on Rot-13 or Base-64. Alternatively, a fixed key was used to encrypt a password. However, these techniques are easily reversible, since anyone with access to the stored passwords and knowledge of the algorithm or the fixed key could easily determine the clear-text password.

More sophisticated one-way cryptographic functions (OWF) were introduced to address the weaknesses discussed above. An OWF uses a cryptographic algorithm to obfuscate and store passwords. The most common type of attacks on stored passwords is a brute force or some type of dictionary/brute force hybrid attack in which an attacker must guess the password, encode it using the proper OWF and compare it to the stored value. If the two match, the right password was found. Unfortunately, certain OWF password encryption algorithms are not cryptographically secure today, while others, although considered cryptographically secure today, will likely not be secure in the near future, particularly in the face of distributed concerted attack efforts.

Conventional OWF password obfuscation techniques are substantially limited in their ability to securely store a password for other reasons as well. The most important problem is that the stored authenticator (the password hash) is the same value used to authenticate the user. In other words, the only secret is the authenticator—the password representation or hash—not the password it represents. For purposes of discussion, the term "hash" is used to denote a stored password representation, whether the password has been obfuscated or not.

On-wire password authentication algorithms can be sniffed and cracked. An authentication sequence on the network can be captured and used to determine, or crack the password. Although, such an attack is difficult to perpetrate as the captured information has undergone one additional cryptographic transformation over the password representation itself, it is possible to use a cryptographically secure storage algorithm but leave the on-wire algorithm vulnerable to brute forcing of the stored value, which can then be used instead of a plaintext passwords as described in 0005 above.

SUMMARY

Systems and methods for password protection are described. In one aspect, an asymmetric key pair is deterministically formed by combining a password and other data. The public key of the asymmetric key pair is exported to an external device. The private key of the asymmetric key pair is used to effect subsequent authentications to the external device.

BRIEF DESCRIPTION OF THE DRAWINGS

In the Figures, the left-most digit of a component reference number identifies the particular Figure in which the component first appears.

DETAILED DESCRIPTION

Overview

Figure 1:
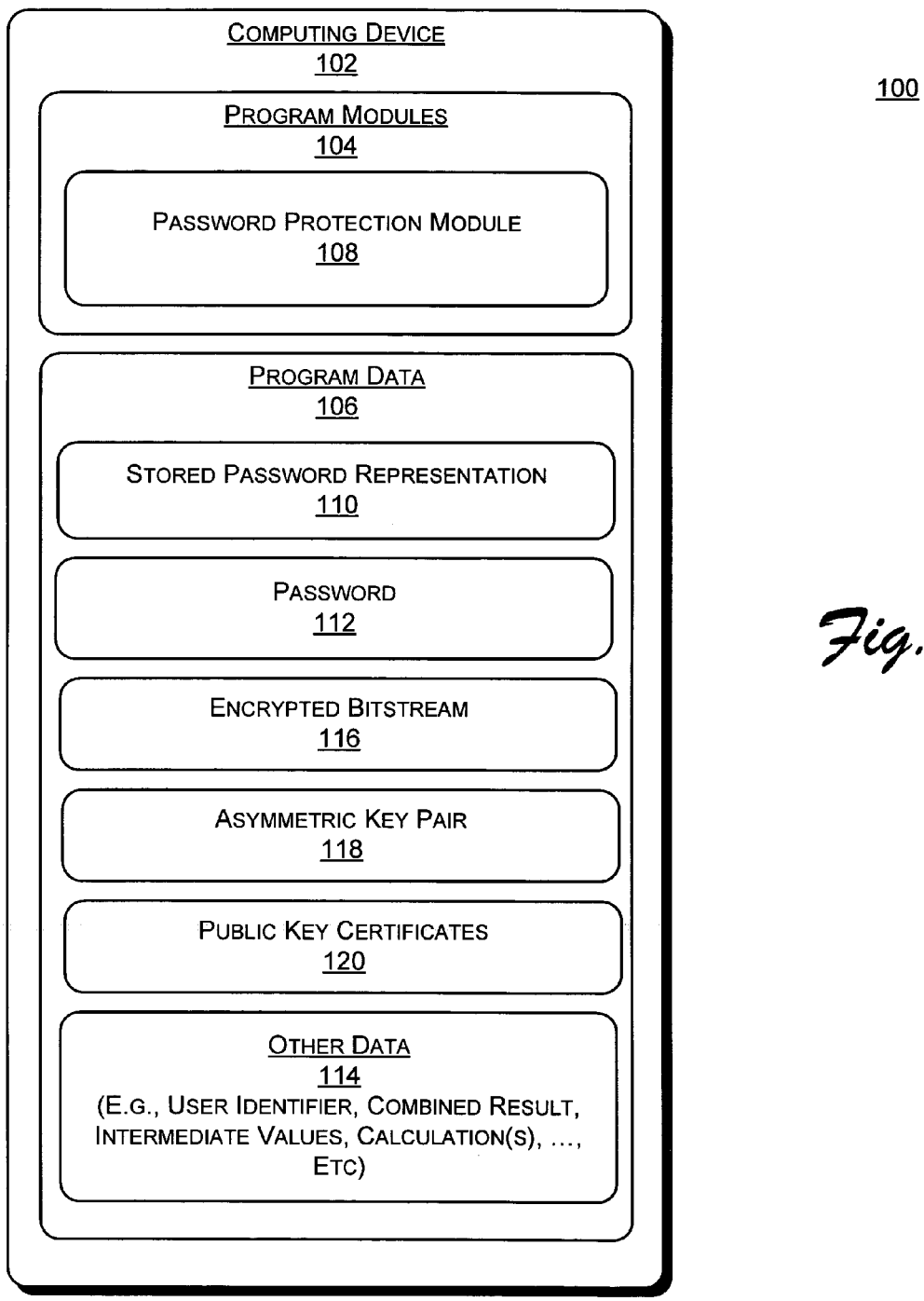
FIG. 1 illustrates an exemplary system for password protection.

Substantially all conventional password storage systems are subject to simple attacks. For instance, password hashes that are not salted are vulnerable to pre-computed hash attacks, wherein an attacker pre-computes a set of password hashes corresponding to certain passwords. (Salting is a process of taking a short value and adding it to a password prior to hashing). Then, once security is breached and the password database has been obtained, the stolen hashes can be compared against the pre-computed hashes to obtain the underlying password in seconds. Essentially, this is a "crack once, use everywhere" attack, whereas conventional password attacks are based on guessing the password and computing the hashes at run time.

In some cases, an attacker does not need to actually reverse engineer a password to compromise a system. In part, this is due to the structure of existing challenge-response protocols, wherein hash(es) representing a stored password can be used directly by an attacker. Password attacks that use hashes directly are known as "pass-the-hash" attacks. They rely on the basic fact that in challenge-response authentication systems, the sole secret used is the hash. An attacker that has the hash can use it in a tool that will respond properly to an authentication challenge and authenticate as the user whose password is represented by that hash. Virtually all modern computer authentication systems are subject to pass-the-hash attacks; some are much more vulnerable than others. "Pass-the-hash" attacks are completely independent of any need to perform computations beyond what is required to obtain the hash(es). Thus, and in contrast to traditional assumptions that password storage systems are as secure as the passwords themselves, password storage systems are not as secure as the passwords themselves. A strong password does not provide any additional security over a weak password if an attacker has access to the hashes. If this happens, all password hashes are equivalent to the plaintext passwords they represent.

Emerging tools such as Rainbow Crack are commonly used to highlight weaknesses in existing password storage algorithms. Rainbow Crack is a freely available implementation of an optimization on an old idea—the idea that instead of calculating all hashes at run-time to crack passwords, the hashes can be calculated beforehand. At run-time the stolen hashes can be compared to the stored ones and matches made by simple lookup. As more people start investigating how passwords are stored and used, it is logical to assume that more effort may be devoted to these types of attacks. Currently, the only known ways of defeating such password attacks in the face of an attacker with access to hashes is through use of smart cards or token-based authentication systems. However, the implementation difficulties of building smart card implementations mean that smart cards will not completely replace passwords in the foreseeable future.

The following systems and methods for password protection address each of the weaknesses described above with respect to conventional password storage techniques, for example, by using cryptographically secure public keys, and by ensuring that what is stored for a particular user is different from what will be used to authenticate the user. These and other aspects of the systems and methods for password protection are now described in greater detail with respect to FIGS. 1 through 4.

An Exemplary System

FIG. 1 shows an exemplary system 100 for password protection. Computing system 100 includes computing device 102, which includes program module(s) 104 and program data 106. Program modules 104 include, for example, password protection module 108. The password protection module 108 implements a pseudo-certificate solution, wherein no trust mechanism is needed, to generate stored password representation 110 from a password 112. A pseudo-certificate solution is so named to distinguish it from a true public-key infrastructure (PKI). In a PKI, all certificates are issued by a certificate server and signed by the certificate server to prove authenticity and validity. Since a certificate server certificate can itself be issued by another certificate server, the entire system generates a trust hierarchy that takes the form of a tree. If an agent in the system trusts a particular node in the tree, the agent will also trust anyone whose certificate is issued by some entity below the trusted node in the tree. In the pseudo-certificate implementation of system 100, the certificates do not emanate from such a central authority, and they are not signed by a certificate server. While the certificate takes the same form as one used in a PKI, this is merely a convenient way to package a set of public and private encryption keys. However, by storing the public and private key pair in a certificate we gain one singular advantage: it allows our system to generate all the existing authentication systems designed for PKI. The certificates are self-signed, and thus are completely valid for use in a PKI, save that they are not part of a trust hierarchy.

System 100 implements a level of security defined as key length such as 1024-bit, 2048-bit, 4096-bit security, or so on. To generate a key, the password protection module 108 combines a user identifier (e.g., a User Principal Name (UPN) or some other arbitrary data associated with the user) with a plaintext password 112. This combination may consist of simple concatenation or any number of other processes such as applying a cryptographic hash to the two items. For purposes of illustration, results of this operation are shown as "combined result" in "other data" 114. In one implementation, a (UPN)—a name of a system user in an e-mail address format—is used as the user identifier. In another implementation, the user identifier is any arbitrary value representing the system user. The specific value does not matter as long as its use is consistent within the system, and the exemplary system allows for all possible values. The user identifier is used to salt the password to prevent two users from having the same stored password value even if their passwords are identical.

Password protection module 108 uses the combined result above to generate a private key and associated public key. In one implementation, the password protection module 108 uses the combined result as the secret key x and computes an associated Diffie-Hellman public key as $y=g^x \mod p$, wherein g and p are integers of bit length corresponding to the level of bit security utilized (e.g., 1024-bit, 2048-bit, etc.). The integers may be predetermined or random. In one implementation, the integers are part of public key certificate 120 to allow use of different key lengths across system 100. Other key generation techniques could also be used such as RSA, DSA, Elliptic Curve methods, and so on.

In one implementation, password protection module 108 creates public key certificate 120 using any desirable public key certificate format, using y as the user's public key and optionally including parameters g and p. The public key certificate is a structure containing, in a specified format, the public portion of the asymmetric key pair (the "public key"), together with identity information, such as a person's name/email address/title/phone number/and/or the like, together with the digital signature of data associated with the user or entity. A public key certificate is also called an identity certificate. The public key certificate is stored on an authentication server. An exemplary such authentication server is shown as remote computer 480 of FIG. 4. Any directory or user identification system can be used to store this public key certificate. Password protection module 108 utilizes the public key certificate 120 to authenticate the user/entity, according to the established rules of certificate-based authentication in the system at hand. An exemplary such authentication session is described below in reference to FIG. 2.

Exemplary Procedure

Figure 2:
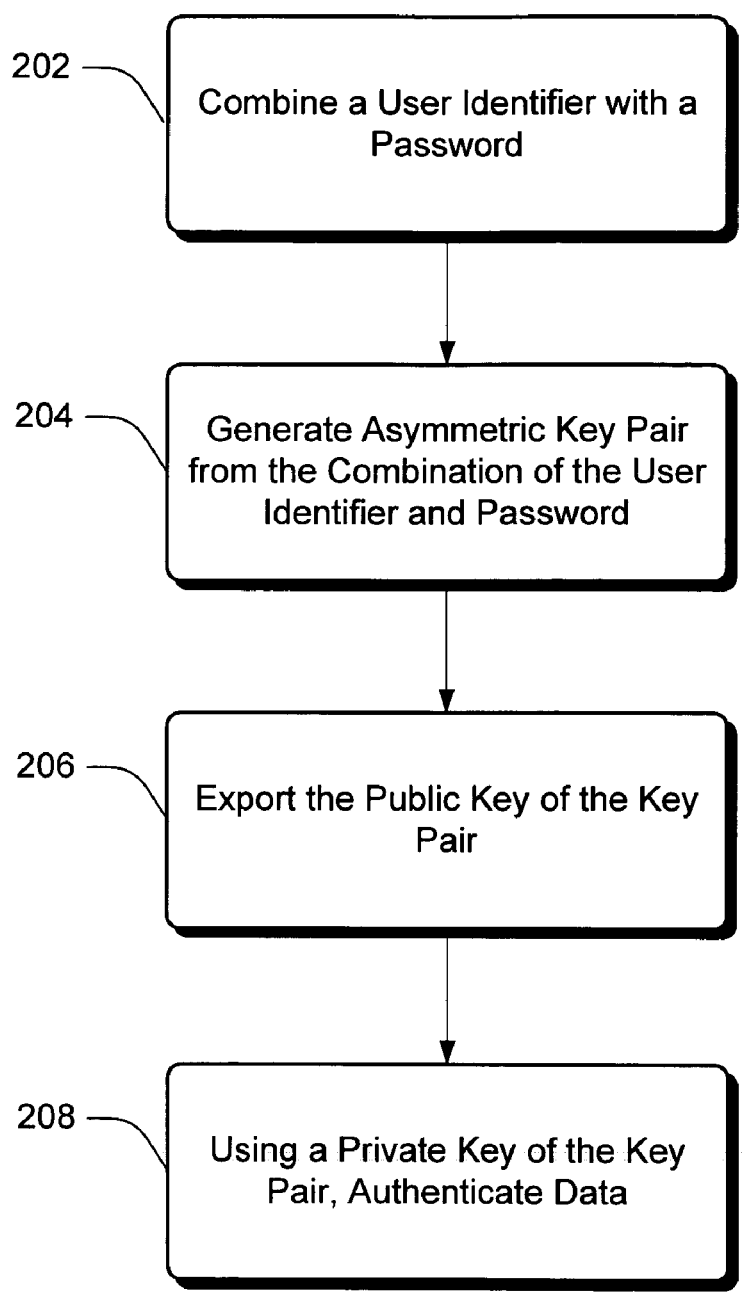
FIG. 2 shows an exemplary procedure for password protection.

FIG. 2 shows an exemplary procedure for password protection. For purposes of exemplary illustration, the operations of FIG. 2 are described with respect to the components of FIG. 1. (In the Figures, the left-most digit of a component reference number identifies the particular Figure in which the component first appears). At block 202, password protection module 108 (FIG. 1) combines a user identifier with a plaintext password 112. For purposes of illustration, results of this operation are shown as "combined result" in "other data" 114. The use of the user identifier serves as a salt to ensure that two users with the same password get different keys. At block 204, password protection module 108 deterministically generates asymmetric key pair 118 (a public and a private key pair) from the combined result—i.e., the process can be repeated the same way, with the same input, and arrives at the same output.

More particularly, password protection module 108 computes a public key from the private data such as the Diffie-Hellman public key $y=g^x \mod p$. In other embodiments, the combined data may be used to deterministically seed a pseudo-random number generator as part of the asymmetric key generation process.

Figure 4:
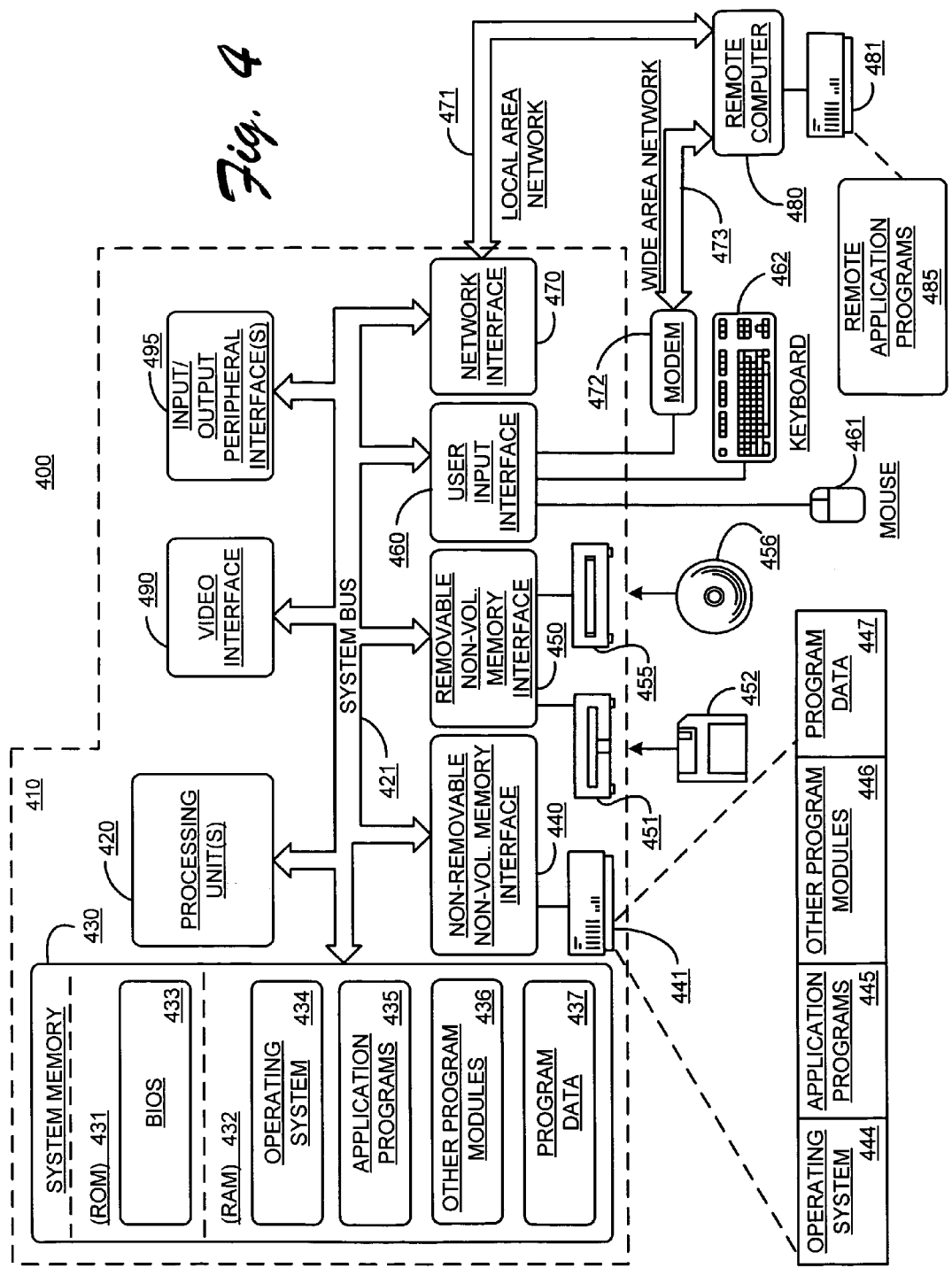
FIG. 4 illustrates an example of a suitable computing environment on which password protection may be fully or partially implemented.

At block 206, password protection module 108 exports a public key of the asymmetric key pair 118 to an external device such as that represented by a remote computer 480 of FIG. 4. At block 208, a private key of the asymmetric key pair is used to effect subsequent authentications to the external device. The authentications are based on any arbitrary type of public key-based authentication scheme.

For example, the systems and methods for password protection can be used with Bellovin/Merritt Encrypted Key Exchange (EKE) protocols. We first describe the Diffie-Hellman version of the EKE protocol and what it accomplishes. Assume client and server have agreed upon a public prime modulus p and a public generator g. The client begins by selecting a random value A and generating an ephemeral Diffie-Hellman value X=g^A mod p and sending this value X to the server. The server generates a random value B and forms Y=gÔB mod p and encrypts this in a way that can be decrypted by the client: Z=E(Y). The server also computes a strong shared key K=X^B mod p.

The server generates a random nonce B' which is encrypted with the strong symmetric key K to form U=K(B') (a slight abuse of notation). The server sends Z and U to the client. The client decrypts Z to obtain Y and computes the same strong shared key K as K=Y^A mod p. The client then generates a random nonce A' and sends V=K(A',B') to the server. The server decrypts V and checks that B' is correct. Assuming that B' is correct, the server sends W=K(A') to the client. The client decrypts W and checks that A' is correct. Assuming that A' is correct, the strong shared K has now been authenticated and can be used for subsequent communications. In its simplest form, the previous two paragraphs have described a Diffie-Hellman key exchange to generate a strong shared key K. Conventional use of EKE is when the client and server share only a weak password, and the encryption (Z=E(Y)) is typically done with a symmetric cipher using the weak password as the key. Following through the nonces, it is clear that EKE prevents an offline attack on the weak password.

In view of the above, and in one implementation, password 112 is a weak password and system 100 implements EKE by generating the asymmetric key pair 118 from the weak password 112.

Figure 3:
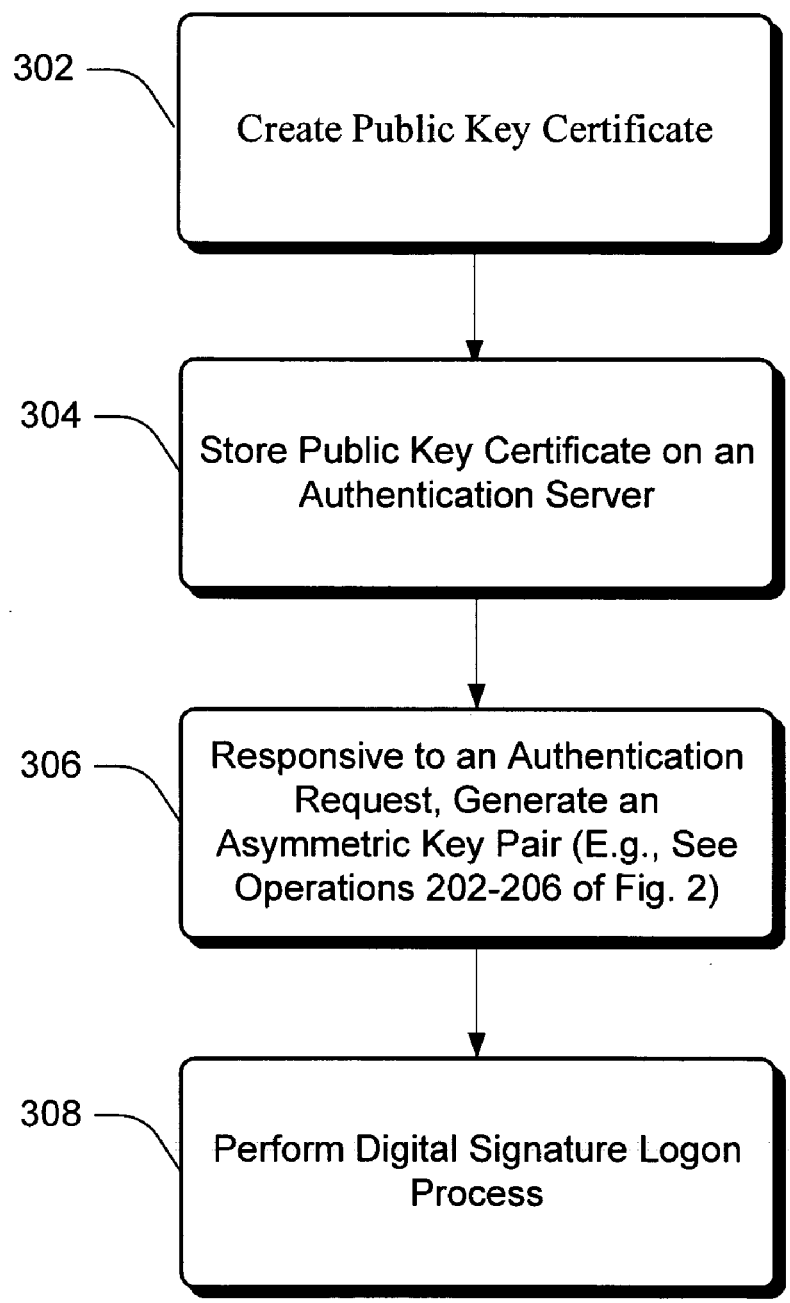
FIG. 3 shows an exemplary procedure for generating public and private key certificates for digital signature logon operations.

FIG. 3 shows an exemplary procedure to create and use public/private key certificates based on the asymmetric key pair of FIG. 1 to perform a certificate-based logon. For purposes of exemplary illustration, the operations of FIG. 3 are described with respect to the components of FIG. 1. (In the Figures, the left-most digit of a component reference number identifies the particular Figure in which the component first appears). At block 302, password protection module 108 creates public key certificate 120 using any desirable public key certificate format, using y as the user's public key. At block 304, password protection module 108 stores the public key certificate 120 on an authentication server. At block 306, and during an authentication session, password protection module 108 calculates the public-private key pair 118 by performing operations 202 through 206. At block 308, password protection module 108 performs an authenticated logon process identical to what would be used with a traditional digital certificate. This can technically be performed using any certificate-based logon technique available. In one implementation, the certificate-based logon technique is a Digital Signature Algorithm (DSA) mechanism.

An Exemplary Operating Environment

Although not required, the systems and methods for password protection are described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 4 illustrates an example of a suitable computing environment for password protection that may be fully or partially implemented. Exemplary computing environment 400 is only one example of a suitable computing environment for the exemplary system of FIG. 1 and exemplary operations of FIGS. 2 and 3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for password protection includes a general purpose computing device in the form of a computer 410 implementing, for example, system 100 of FIG. 1. The following described aspects of computer 410 are exemplary implementations of client computing device 102 of FIG. 1. Components of computer 410 may include, but are not limited to, processing unit(s) 420, a system memory 430, and a system bus 421 that couples various system components including the system memory to the processing unit(s) 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, etc.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, or program modules, and includes any information delivery media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules, and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Application programs 435 includes, for example program modules 104 of FIG. 1. Program data 437 includes, for example, program data 106 of FIG. 1. Operating system 444, application programs 445, other program modules 446, and program data 447 are given different numbers here to illustrate that they are at least different copies.

In one implementation, a user may enter commands and information into the computer 410 through input devices such as a keyboard 462 and pointing device 461, commonly referred to as a mouse, trackball, or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port, 1394/Firewire, accelerated graphics port, or a universal serial bus (USB).

The computer 410 operates in a networked environment using logical connections to one or more remote computers, such as a remote computer 480. The remote computer 480 may be a personal computer, a server, a router, a network PC, a mobile computing device, a peer device, or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets, and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

Conclusion

Although the systems and methods for password protection have been described in language specific to structural features and/or methodological operations or actions, it is understood that the implementations defined in the appended claims are not necessarily limited to the specific features or actions described. Accordingly, the specific features and operations are disclosed as exemplary forms of implementing the claimed subject matter.

The invention claimed is:

1. A method comprising:
   concatenating a password with other data;
   generating a value based on the concatenated password and the other data;
   forming a first asymmetric key pair having a security level by performing a key generation computation on the value, the security level determined by the number of bits of a cryptography algorithm used to perform the key generation computation;
   formulating a self-signing pseudo public key certificate that includes the first asymmetric key pair, the self-signing pseudo public key certificate having a Public Key Infrastructure (PKI) format and is not issued by a PKI central certificate server;
   exporting the self signing pseudo public key certificate to an external device; and
   responsive to an authentication session, forming a second asymmetric key pair by performing a key generation computation as part of a digital signature logon process wherein the process relies at least in part on the self-signing pseudo public key certificate as exported to the external device.

2. A method as recited in claim 1, wherein the forming the first or the second asymmetric key pairs includes performing a key generation computation based on Diffie-Hellman, RSA, DSA, or any other suitable algorithm for generating an asymmetric key pair.

3. A method as recited in claim 1, wherein the password is a plaintext password.

4. A method as recited in claim 1, wherein the password is a weak password generated as a function of encrypted key exchange protocols.

5. A method as recited in claim 1, wherein the other data is a User Principal Name or other value substantially unique to a user.

6. A method as recited in claim 1, wherein the concatenating a password with other data includes combining the password and the other data via a cryptographic function.

7. A method as recited in claim 1, wherein the generating a value includes pseudo-randomly generating a value based on the concatenated password and the other data.

8. A method as recited in claim 1, wherein the external device is a server.

9. A computer-readable storage medium comprising computer-program stored data representing instructions executable by a processor for:
concatenating a password with other data;
generating a value based on the concatenated password and the other data;
forming a first asymmetric key pair having a security level by performing a key generation commutation on the value, the security level being determined by the number of bits of a cryptography algorithm used to perform the key generation computation;
formulating a self-signing pseudo public key certificate based on that includes the first asymmetric key pair, the self-signing pseudo public key certificate having a Public Key Infrastructure (PKI) format and is not issued by a PKI central certificate server;
exporting the self-signing pseudo public key certificate of the first asymmetric key pair to an external device; and
responsive to an authentication session, forming a second asymmetric key pair by performing a key generation computation as part of a digital signature logon process wherein the process relies at least in part on the self-signing pseudo public key certificate as exported to the external device.

10. A computer-readable storage medium as recited in claim 9, wherein the first and second asymmetric key pairs are generated based on Diffie-Heliman, RSA, DSA, or any other suitable algorithm for generating an asymmetric key pair.

11. A computer-readable storage medium as recited in claim 9, wherein the password is a plaintext password.

12. A computer-readable storage medium as recited in claim 9, wherein the password is a weak password generated as a function of encrypted key exchange protocols.

13. A computer-readable storage medium as recited in claim 9, wherein the other data is a User Principal Name or other value substantially unique to a user.

14. A computer-readable storage medium as recited in claim 9, wherein the computer-program instructions for forming the first asymmetric key pair further comprise instructions for:
concatenating the password and the other data;
via a cryptographic function.

15. A computer-readable storage medium as recited in claim 9, wherein the computer-program instructions for forming the first asymmetric key pair further comprise instructions for seeding a pseudo-random number generator with the concatenated password and the other data to generate the first asymmetric key pair.

16. A computer-readable storage medium as recited in claim 9, wherein the external device is a server.

17. A computing device comprising:
a processor; and
a memory coupled to the processor, the memory comprising computer-program instructions executable by the processor for:
concatenating a password with other data;
generating a value based on the concatenated password and the other data;
forming a first asymmetric key pair having a security level by performing a key generation computation on the value, the security level being determined by the number of bits of a cryptography algorithm used to perform the key generation computation;
formulating a self-signing pseudo public key certificate that includes the first asymmetric key pair, the self-signing pseudo public key certificate having a Public Key Infrastructure (PKI) format and is not issued by a PKI central certificate server;
exporting the self-signing pseudo public key certificate of the first asymmetric key pair to an external device; and
responsive to an authentication session, forming a second asymmetric key pair by performing a key generation computation as part of a digital signature logon process wherein the process relies at least in part on the self-signing pseudo public key certificate as exported to the external device.

18. A computing device as recited in claim 17, wherein the first and second asymmetric key pairs are generated based on Diffie-Hellman, RSA, DSA, or any other suitable algorithm for generating an asymmetric key pair.

19. A computing device as recited in claim 17, wherein the password is a plaintext password.

20. A computing device as recited in claim 17, wherein the password is a weak password generated as a function of encrypted key exchange protocols.

21. A computing device as recited in claim 17, wherein the other data is a User Principal Name or other value substantially unique to a user.

22. A computing device as recited in claim 17, wherein the computer-program instructions for forming the first asymmetric key pair further comprise instructions for:
concatenating the password and the other data;
via a cryptographic function.

23. A computing device as recited in claim 17, wherein the computer-program instructions for forming the first asymmetric key pair further comprise instructions for seeding a pseudo-random number generator with the concatenated password and the other data to generate the first asymmetric key pair.

24. A computing device as recited in claim 17, wherein the external device is a server.

* * * * *

UNITED STATES PATENT AND TRADEMARK OFFICE
CERTIFICATE OF CORRECTION

PATENT NO.         : 7,602,910 B2                                        Page 1 of 1
APPLICATION NO.    : 10/990798
DATED              : October 13, 2009
INVENTOR(S)        : Jesper M. Johansson et al.

It is certified that error appears in the above-identified patent and that said Letters Patent is hereby corrected as shown below:

In the Claims:

In column 8, line 53, in Claim 1, delete "self signing" and insert -- self-signing --, therefor.

In column 9, line 22, in Claim 9, delete "commutation" and insert -- computation --, therefor.

In column 9, line 27, in Claim 9, after "on" delete "that includes".

In column 9, line 41, in Claim 10, delete "Diffie-Heliman," and insert -- Diffie-Hellman, --, therefor.

In column 9, line 55, in Claim 14, delete "data;" and insert -- data --, therefor.

In column 10, line 48, in Claim 22, delete "data;" and insert -- data --, therefor.

Signed and Sealed this
First Day of February, 2011

David J. Kappos
*Director of the United States Patent and Trademark Office*